May 6, 1958

J. W. IRWIN ET AL 2,833,165

CHAIN SAW FILING DEVICE

Filed March 6, 1956

INVENTOR
JOHN W. IRWIN
LILLIAN J. IRWIN

BY
McMorrow, Berman + Davidson
ATTORNEYS

May 6, 1958 J. W. IRWIN ET AL 2,833,165
CHAIN SAW FILING DEVICE
Filed March 6, 1956 2 Sheets-Sheet 2
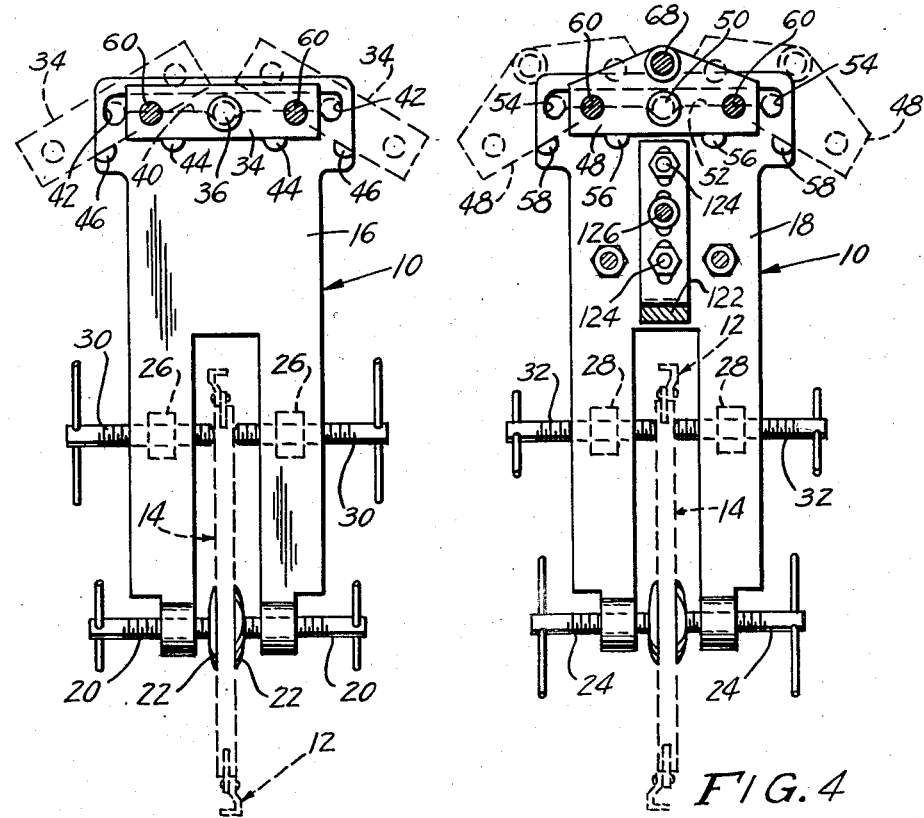
FIG. 3
FIG. 4
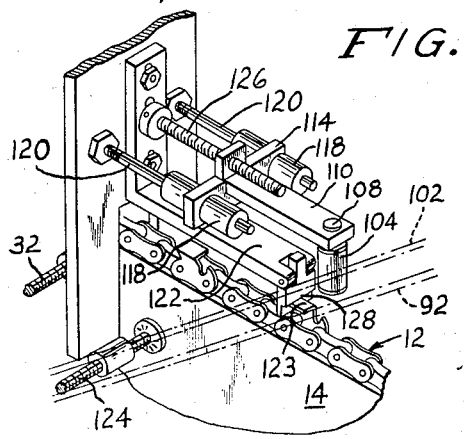
FIG. 6
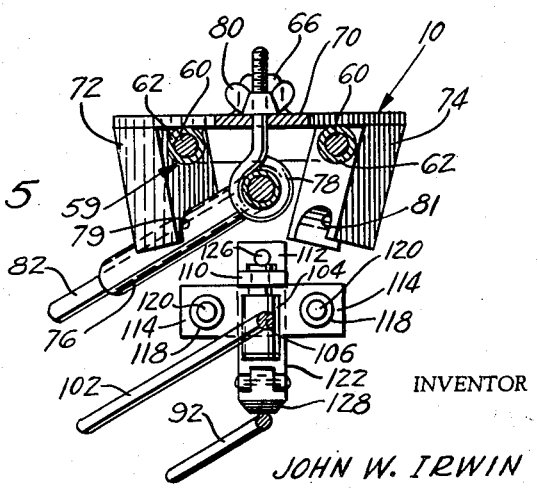
FIG. 5
INVENTOR
JOHN W. IRWIN
LILLIAN J. IRWIN
BY
McMorrow, Berman & Davidson
ATTORNEYS

United States Patent Office 2,833,165
Patented May 6, 1958

2,833,165

CHAIN SAW FILING DEVICE

John W. Irwin and Lillian J. Irwin, Chester, Calif.

Application March 6, 1956, Serial No. 569,884

5 Claims. (Cl. 76—31)

This invention relates to a portable device for filing the teeth of a chain saw, and summarized briefly, comprises a support connectable directly to a chain saw bar for filing the teeth without the chain saw being removed from the bar; a manually reciprocable file assembly being carried by said support and being adjustable with precision to selected positions for filing each tooth to an exact depth, bevel, and length.

The main object of the invention is to provide a generally improved device of the class described, designed to insure the exact location of a selected file element relative to the tooth so that a selected surface of the tooth will be properly sharpened by axial reciprocation of the file in the selected location.

Another object is to effect adjustment of the file holder and file element longitudinally of the chain from a sharpened tooth to the next tooth that is to be sharpened without losing the adjustment of the holder made for the purpose of precision sharpening of selected corresponding surfaces of the teeth, thus to insure that all the teeth will be sharpened identically to one another.

Other objects will appear from the following description, the claims appended thereto, and from the annexed drawing, in which like reference characters designate like parts throughout the several views, and wherein:

Figure 3 is a transverse section on line 3—3 of Figure 2;

Figure 4 is a transverse section on line 4—4 of Figure 1;

Figure 5 is a transverse section on line 5—5 of Figure 1; and

Figure 6 is a fragmentary perspective view illustrating the relative positions of the means for controlling the length of the tooth being sharpened and of the tooth stop holder bar and its associated tooth stop.

The filing device 10 constituting the invention has been shown in proper position upon a chain saw having a saw chain 12 travelling in a peripheral groove of a chain saw bar 14.

Figure 1:
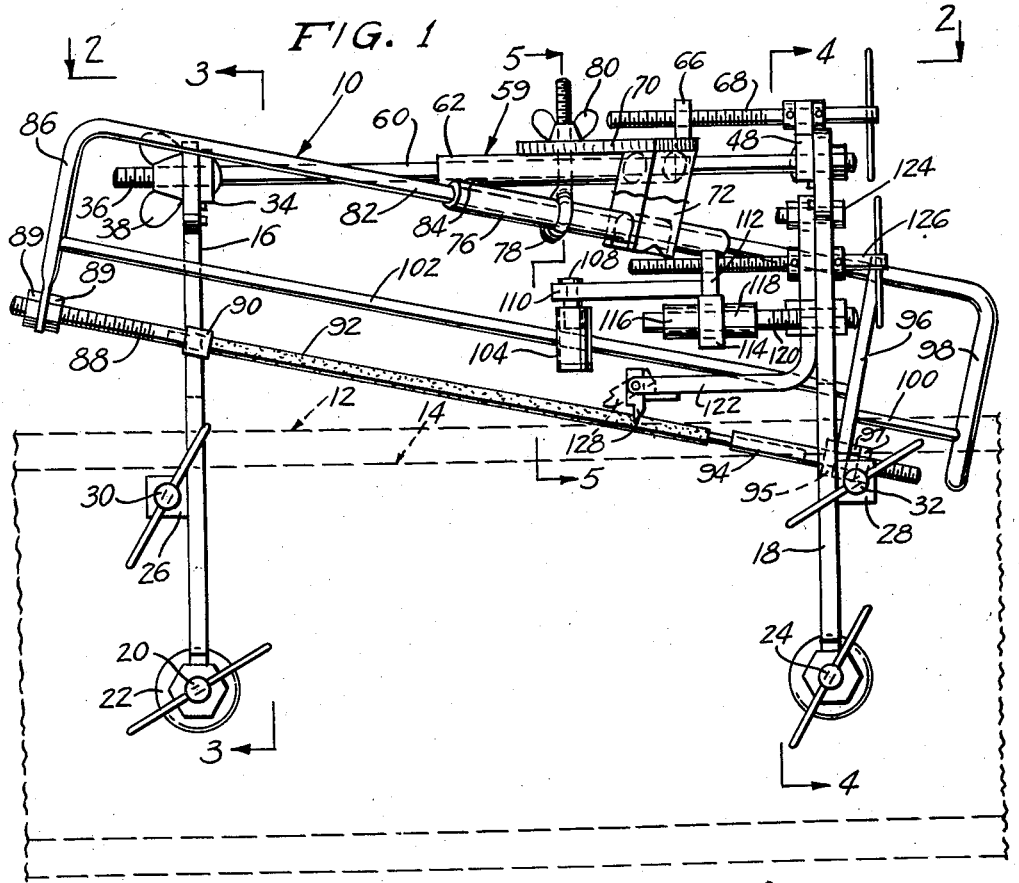
Figure 1 is a side elevational view of the device in which a chain saw bar and saw chain are shown in dotted lines.

The device includes a support frame which, when viewed in side elevation as in Figure 1, is of inverted U shape, with legs clampingly receiving the bar 14 and a horizontal bight providing a trackway for a file holder support carriage in a manner to be presently described.

The legs of the frame are constituted by vertically disposed end plates 16, 18 lying in planes perpendicularly intersecting the plane of the chain saw bar 14, each end plate having a downwardly opening slot medially between opposite side edges thereof receiving the bar (see Figures 3 and 4). Threadedly engaged in the lower end of the end plate 16 are clamp screws 20 having swivelled clamp discs 22 extending within the slot and clampably engaging opposite faces of the chain saw bar. Similar clamp screws 24 are carried by the end plate 18. Rigidly attached to the end plates 16, 18 are blocks 26, 28 in which are threaded auxiliary clamp screws 30, 32 respectively, clampably engaging opposite faces of bar 14 adjacent the periphery thereof.

Extending transversely of the upper end of end plate 16 is a plate element 34. Through the center of element 34 there is extended a bolt 36 having a wing nut 38, said bolt being extended through a slot 40 (Figure 3) formed in and extending transversely of end plate 16. Depending extensions or recesses 42 are provided in the ends of the slot. Thus, as shown in Figure 3, the plate element is mounted on the stationary plate 16 for adjustment within the slot transversely of end plate 16, and at opposite extreme limits of its travel within the slot, is tiltable about the axis of bolt 36 in either direction, as will be readily observed from the dotted line showings of the adjusted positions of the plate element. Supporting the plate element horizontally when said element is in its full line, middle position of Figure 3 are lugs 44 formed on plate 16, and similarly supporting the plate element in its end positions of adjustment are lugs 46, 46.

On the end plate 18, there is a plate element 48 at the upper end thereof carried by a bolt 50 extending through a transverse slot 52 of plate 16, said slot having depending extensions 54, supporting plate element 50 in its middle position, shown in full lines in Figure 4, are lugs 56, and supporting the plate element in its end positions of adjustment are lugs 58.

Connected between the end plates are laterally spaced, parallel rods 60, 60 forming a transversely adjustable, laterally tiltable bight of the carriage support frame due to the adjustable mounting of the rod-supporting plate elements 34, 48 on the stationary legs 16, 18 of the frame.

The carriage has been designated generally at 59 and includes sleeves 62, 62 sliding on rods 60, 60 and fixedly connected at one end by a cross bar 64 formed medially between the sleeves with an upstanding projection 66 having a threaded opening receiving a carriage shift screw 68 rotatable in an opening formed in plate element 48.

Lying in a horizontal plane and fixedly secured to the sleeves 62 in overlying relation thereto is a flat, V-shaped file holder support plate 70. The apex of the plate is disposed midway between the sleeves (Figure 2) and affixed to and depending from the legs of the plate are file holder guide blades 72, 74. These converge downwardly (Figure 5) and also are inclined slightly out of a vertical plane perpendicularly intersecting the guide rods 60, 60. Adjacent their upper ends, the blocks are apertured to receive the sleeves 62, 62.

Figure 2:
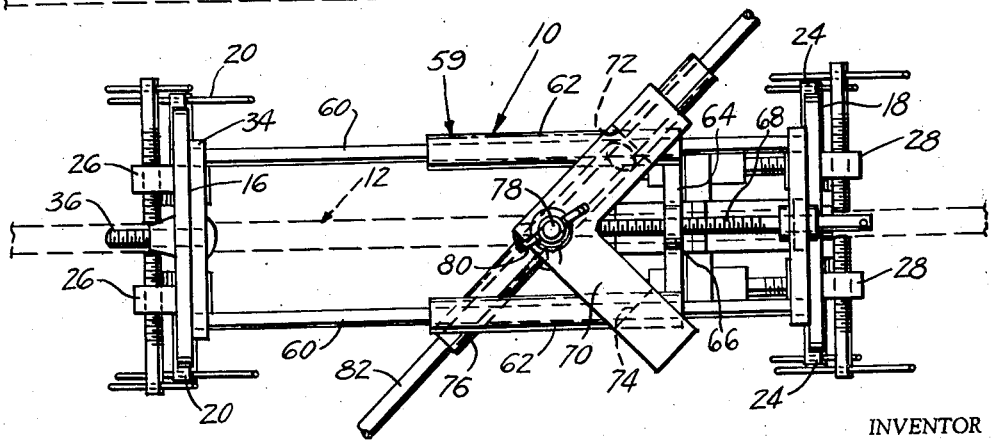
Figure 2 is a top plan view.

A file holder support sleeve 76 extends through an eye bolt 78 at an inclination from the horizontal and has its axis oblique to the length of the trackway defined by rods 62, 62 (Figure 2). At its forward end, the sleeve is engageable in a downwardly opening recess 79 of block 72 and is held firmly in position within said recess by turning a wing nut 80, carried by the eye bolt, home against plate 70. The sleeve can be reversed in its oblique disposition to the length of the trackway by loosening the wing nut and turning the sleeve about the axis of the eye bolt, so that it will engage in a recess 81 of block 74 rather than in recess 79 of block 72.

A file holder includes an elongated frame comprising a back bar 82 slidably reciprocable and also rotatable in sleeve 76. To further insure the firm and immovable retention of the sleeve 76 in its selected position, each file holder support sleeve 76 has a shallow, downwardly opening notch 84 receiving the rear end of sleeve 76.

At its rear end, the back bar is formed integrally with a depending extension 86 apertured to receive a threaded shank 88 secured in selected positions of axial adjustment by lock nuts 89, 89. Shank 88 extends in parallelism with the back bar and at its front end has an axial recess threaded to receive a complementarily threaded axial extension of a file head socket 90. This is recessed to receive the head end of a round file 92 the tail of which is engaged in a sleeve-like file tail socket 94. Socket 94 is rotatable within an opening formed in the lower end of an end bar 96 rigid with and extending downwardly from back bar 82. At one side of end bar 96, a nut 95 is securely engaged with the socket 94. At the other side of the end bar, a pair of nuts 97 is provided, these being jammed together to provide an abutment that will permit free rotation of socket 94 while yet holding the same against endwise movement. The round file thus is rotatable with tail socket 94, the head of the file freely rotating in socket 90.

The head and tail sockets shown may be interchanged with others to receive other than round files, such as V-edged, flat, diamond-charged, etc.

To provide a front handle on the holder there is a depending integral extension 98 on the front end of the back bar braced as at 100. The user thus grasps extensions 86, 98 to reciprocate the holder and the file upon the carriage.

A longitudinal brace bar 102 extends between extension 86 and end bar 96. A means for controlling the length of the tooth being sharpened includes a gage block 104. The block 104 is freely swivelled on a stem 108 depending from the free end of a gage support bar 110 projecting from and rigid with a follower 112. As shown in Figure 5, a cross piece 114 is integrally connected to one end of the follower 112 and has laterally spaced guide tubes 118 secured thereto in parallelism with the trackway composed of rods 60, 60 and the tubes 118 are slidably mounted on rods 120 connected to end plate 18 for axial adjustment.

An L-shaped tooth stop holder bar 122 has an upwardly projecting leg slotted (Figure 4) to receive bolts 124 connecting the same to end plate 18, thus mounting the holder bar for vertical adjustment on the frame. A tooth stop 128 is pivoted on the free end of the bar 122 and is swingable into engagement with one end of a tooth being sharpened, (see Figure 6) so as to hold the saw chain against movement while the tooth 123 is being filed.

The device is usable for filing various types of chains. For example, when the plate elements 34, 48 are in their full line positions of Figures 3 and 4 respectively, the file is properly disposed for filing round tooth chains, with file 92 being adapted to pass obliquely through the recesses provided on the teeth of said chains, to renew the cutting edges of said teeth. The tilted positions shown in dotted lines in Figures 3 and 4 are for properly positioning the file for filing chisel bit chains.

In use, and assuming that a round tooth chain is being filed, the tooth stop holder bar 122 is vertically adjusted to engage the stop 128 against one end of the tooth 123 the screw 68 is turned to shift the carriage longitudinally to a selected position on the trackway. The file 92, being inclined from the horizontal and extending obliquely across the chain, will be raised or lowered, as the case may be, and thus, by engaging guide sleeve 76 against the underside of the adjustably positioned carriage, the bevel and depth of the cut will be correspondingly adjustably set. The gage block 104, meanwhile, is adjusted by means of screw 126 to a selected position, and bars 102 is pivoted into contact with the gage block 104, the predetermined selected setting of the block 104 determining the length of the cut.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A device for sharpening the teeth of a chain saw mounted on a chain bar, said device comprising a frame including a pair of spaced confronting elongated substantially rectangular end plates slotted at one of their respective adjacent ends to receive said chain saw bar therebetween, means on opposite sides of each of said slots to releasably secure said end plates on said chain saw bar, a pair of laterally spaced and substantially parallel elongated rods extending between and supported on said end plates proximate their respective other adjacent ends, a carriage slidably mounted on said rods and comprising a pair of elongated sleeves having a cross bar fixedly connected to one of their respective adjacent ends, said cross bar having an integrally formed internally threaded projection, a carriage shift screw rotatably supported on one of said end plates and threadedly engaging within said projection, and means depending from said carriage for supporting a chain file for reciprocation transversely of said chain saw.

2. A device for sharpening the teeth of a chain saw mounted on a chain bar, said device comprising a frame including a pair of spaced confronting elongated and substantially rectangular end plates slotted at one of their respective adjacent ends to receive said chain saw bar therebetween, means on opposite sides of each of said slots to releasably secure said end plates on said chain saw bar, a plate element pivotally and slidably mounted on each of said end plates, said plate elements being mounted for sliding movement in a direction perpendicular to the longitudinal axis of said end plates and being disposed in confronting relation, a pair of laterally spaced and substantially parallel elongated rods extending between and supported on said elements, a carriage slidably mounted on said rods comprising a pair of elongated sleeves having a cross bar fixedly secured to one of their respective adjacent ends, said crossbar having an integrally formed internally threaded projection, a carriage shift screw rotatably supported on one of said plate elements and threadedly engaging within said projection, and means depending from said carriage for supporting a chain file for reciprocation transversely of said chain saw.

3. A device for sharpening the teeth of a chain saw mounted on a chain bar, said device comprising a frame including a pair of spaced confronting elongated and substantially rectangular end plates slotted at one of their respective ends to receive said chain bar therebetween, means on opposite sides of each of said slots to releasably secure said end plates on said chain saw bar, a plate element pivotally and slidably mounted on each of said end plates, said end elements being mounted for sliding movement in a direction perpendicular to the longitudinal axis of said end plates and disposed in confronting relation, a pair of laterally spaced and substantially parallel elongated rods extending between and supported on said end elements, a carriage slidably mounted on said rods and comprising a pair of elongated sleeves having a crossbar fixedly secured to one of their respective adjacent ends, said crossbar having an integrally formed internally threaded projection, a carriage shift screw rotatably supported on one of said end elements and threadedly engaging within said projection, a substantially V-shaped file holder support plate fixedly secured to said sleeves with the apex thereof disposed substantially midway therebetween, a file holder guide block for each leg of said file holder support plate, said blocks being fixedly secured to said legs and depending therefrom in a downwardly converging direction, said blocks each being apertured to receive said sleeves therein, each of said blocks having a downwardly opening recess formed therein, an eyebolt extending through said V-shaped file holder support plate, said sleeve extending through said eye-bolt and being engageable within one of said downwardly opening recesses, a file holder, said file holder comprising an elongated substantially rectangular frame including a back bar slidably mounted and rotatable within said file holder support sleeve, one end of said back bar having an integrally formed extension, a second extension depending from said back bar at the other end thereof, a third depending extension from said back bar, said third depending extension being disposed adjacent to but spaced from said second depending extension, a longitudinally extending brace bar having its ends connected respectively to said first depending extension and to said third depending extension, means for controlling the length of a tooth being sharpened comprising a gage block swiveled on one end of a support bar the other end of said support bar having an internally threaded follower projecting laterally therefrom, a crosspiece fixedly secured to one end of said follower, a manually operable externally threaded screw mounted for rotation on one of said support plates and threadedly engaging said follower, sad gage block being movable towards and away from said one of said end plates and is adapted for tangential engagement with said brace rod in a predetermined adjusted position, and an L-shaped tooth stop holder bar mounted on said one support plate for adjustment thereon in the direction of the longitudinal axis of said one end plate, a tooth stop pivotally mounted on said tooth stop holder bar, said tooth stop being swingable into engagement with one end of said tooth being sharpened to hold the saw chain against movement while said tooth is being filed, and file holding means for connecting the opposed ends of a file to said first and second depending extensions from said back bar.

4. A device for sharpening the teeth of a chain saw mounted on a chain bar, as defined in claim 3, wherein guide means are provided for said gage block, said guide means comprising a pair of guide sleeves extending transversely through said crosspiece, said sleeves being slidably mounted on a pair of rods having one of their respective ends fixedly secured to said one end plate.

5. A device for sharpening the teeth of a chain saw mounted on a chain bar, as defined in claim 4, and means for fixedly securing said carriage in adjusted relation with said brace bar tangentially engaging said gage block.

References Cited in the file of this patent

UNITED STATES PATENTS

| | | |
|---|---|---|
| 527,332 | Howard | Oct. 9, 1894 |
| 566,003 | Mitchell | Aug. 18, 1896 |
| 758,551 | Merwine | Apr. 26, 1904 |
| 934,510 | Edwards | Sept. 21, 1909 |
| 1,024,387 | Angell | Apr. 23, 1912 |
| 1,165,248 | Hanson | Dec. 21, 1915 |
| 2,427,412 | McCulley | Sept. 16, 1947 |
| 2,505,278 | Coughlan | Apr. 25, 1950 |
| 2,755,559 | Pearce | July 24, 1956 |
| 2,762,241 | Nielson | Sept. 11, 1956 |